(12) United States Patent
Pawar et al.

(10) Patent No.: US 10,137,980 B2
(45) Date of Patent: Nov. 27, 2018

(54) HUB ASSEMBLY AND PROPELLER ASSEMBLIES

(71) Applicant: GE Aviation Systems LLC, Grand Rapids, MI (US)

(72) Inventors: Rajendra Vishwanath Pawar, Bangalore (IN); David Raju Yamarthi, Bangalore (IN); Amit Arvind Kurvinkop, Bangalore (IN); Sandeep Kumar, Bangalore (IN); Murugesan Periasamy, Bangalore (IN); Ravindra Shankar Ganiger, Bangalore (IN); Bajarang Agrawal, Bangalore (IN); Nagashiresha G, Bangalore (IN)

(73) Assignee: GE Aviation Systems LLC, Grand Rapids, MI (US)

( * ) Notice: Subject to any disclaimer, the term of this patent is extended or adjusted under 35 U.S.C. 154(b) by 151 days.

(21) Appl. No.: 14/797,233

(22) Filed: Jul. 13, 2015

(65) Prior Publication Data
US 2017/0015404 A1 Jan. 19, 2017

(51) Int. Cl.
*B64C 11/06* (2006.01)
*B64C 11/02* (2006.01)
*B64C 11/30* (2006.01)

(52) U.S. Cl.
CPC .............. *B64C 11/06* (2013.01); *B64C 11/02* (2013.01); *B64C 11/30* (2013.01)

(58) Field of Classification Search
CPC .......... B64C 11/06; B64C 11/30; F04D 29/34
USPC .................. 416/220 A, 205–209, 244 R, 174
See application file for complete search history.

(56) References Cited

U.S. PATENT DOCUMENTS

| 1,801,486 A | | 4/1931 | Caldwell | |
|---|---|---|---|---|
| 1,870,361 A | | 8/1932 | Hamilton | |
| 2,232,670 A | * | 2/1941 | Barrett | F04D 29/36 416/207 |
| 2,528,281 A | * | 10/1950 | Martin | B64C 11/06 416/158 |
| 2,628,687 A | * | 2/1953 | Allen, Jr. | B64C 11/06 416/205 |

(Continued)

FOREIGN PATENT DOCUMENTS

| EP | 1061263 A1 | 12/2000 |
|---|---|---|
| FR | 2 943 984 A1 | 10/2010 |

(Continued)

OTHER PUBLICATIONS

Great Britain Combined Search and Examination Report issued in connection with corresponding GB Application No. 1612072.7 dated Jan. 11, 2017.

(Continued)

*Primary Examiner* — Logan Kraft
*Assistant Examiner* — Elton Wong
(74) *Attorney, Agent, or Firm* — GE Aviation Systems LLC; William Andes

(57) ABSTRACT

Hub assembly and propeller blade assemblies incorporating partial hub assembly having a backing plate with a set of partial root seats and a set of clamps selectively operably couplable to the backing plate with each clamp defining a second partial root seat and wherein when a clamp is coupled to the backing plate a root seat is formed, propeller blades having roots are received within the root seats.

12 Claims, 5 Drawing Sheets

(56) References Cited

U.S. PATENT DOCUMENTS

| | | | | |
|---|---|---|---|---|
| 2,718,268 A | * | 9/1955 | Cushman | B64C 11/06 416/205 |
| 2,918,977 A | * | 12/1959 | Fedan | F04D 29/34 416/214 R |
| 3,130,677 A | | 4/1964 | Liebhart | |
| 3,159,221 A | * | 12/1964 | Gaubis | B64C 11/06 416/207 |
| 4,150,921 A | * | 4/1979 | Wennberg | B63H 1/20 416/207 |
| 2009/0035142 A1 | | 2/2009 | Wang | |
| 2013/0202450 A1 | | 8/2013 | Ivakitch et al. | |
| 2016/0009373 A1 | * | 1/2016 | Kondor | B64C 11/343 416/149 |

FOREIGN PATENT DOCUMENTS

| | | |
|---|---|---|
| GB | 264603 A | 1/1927 |
| WO | 0051700 A1 | 9/2000 |
| WO | 0118403 A1 | 3/2001 |

OTHER PUBLICATIONS

Unofficial English Translation of Japanese Office Action issued in connection with corresponding JP Application No. 2016133799 dated Jun. 27, 2017.

Great Britain Office Action issued in connection with corresponding GB Application No. 1612072.7 dated Sep. 25, 2017.

Examination Report issued in connection with corresponding GB Application No. 1612072.7 dated Apr. 3, 2018.

* cited by examiner

HUB ASSEMBLY AND PROPELLER ASSEMBLIES

BACKGROUND OF THE INVENTION

Propeller assemblies typically include multiple blades mounted to a hub, which is rotated by the engine. The hub typically defines a housing for a blade root of a propeller blade along with any retention mechanisms and pitch change mechanisms.

The blades can be line-removable and retained to the hub so as to supporting operating loads, including a centrifugal force component that acts in a direction parallel to the longitudinal axis of the propeller blade. Modern retention systems use an assembly of bearings to retain the propeller blade to the hub. Each blade root is retained within its own socket for rotation therein about a pitch change axis through use of the assembly of bearings. It is known to preload the bearings in order to maintain their stability under high centrifugal and thrust forces experienced during operation.

BRIEF DESCRIPTION OF THE INVENTION

In one aspect, an embodiment of the invention relates to a propeller assembly including a partial hub having a backing plate with a set of partial root seats and a set of clamps selectively operably couplable to the backing plate with each clamp defining a second partial root seat and wherein when a clamp is coupled to the backing plate a root seat is formed, a propeller blade having a root received within the root seat.

In another aspect, an embodiment of the invention relates to a partial hub for a propeller assembly, including a backing plate with a set of partial root seats with each contour partially defining a root seat and a set of clamps selectively operably couplable to the backing plate with each clamp defining a second partial root seat and wherein when a clamp is coupled to the backing plate a root seat is formed.

In yet another aspect, an embodiment of the invention relates to a propeller assembly, including a partial hub having a backing plate with a contour partially defining a root seat and a clamp selectively operably couplable to the backing plate to define a second partial root seat and wherein when a clamp is coupled to the backing plate a root seat is formed, a propeller blade having a root received within the root seat, a bearing assembly provided between the root and the partial hub and where the bearing assembly allows the blade to rotate within the partial hub, and a retainer mounted to an outer periphery of the backing plate and an outer periphery of the clamp and configured to retain the propeller blade within the root seat.

DESCRIPTION OF EMBODIMENTS OF THE INVENTION

Figure 1:
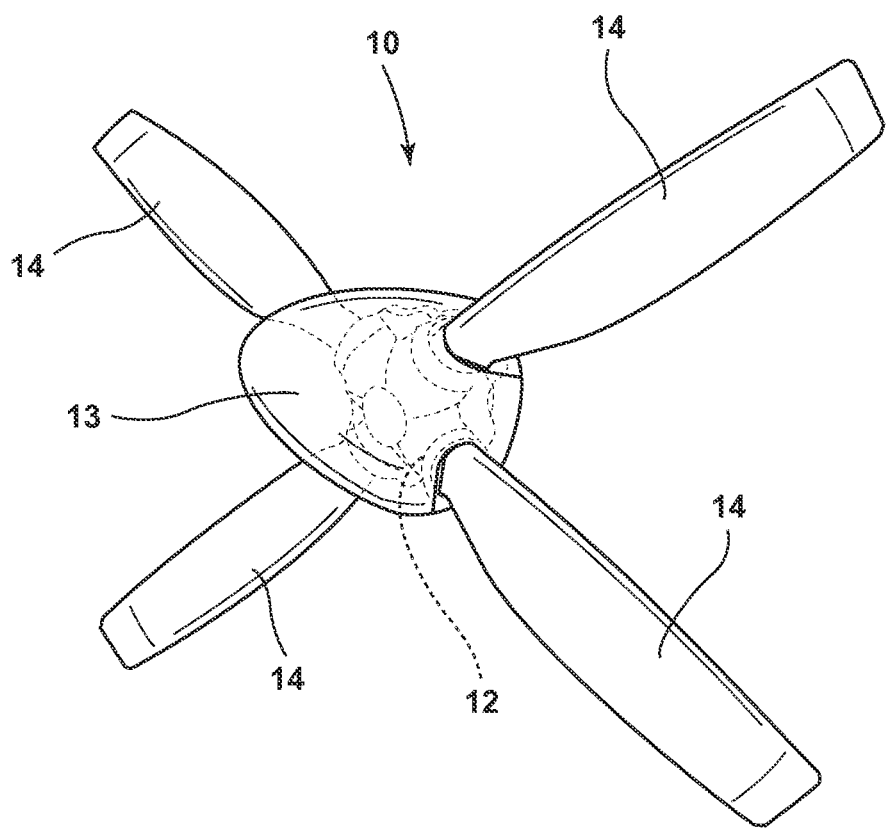
FIG. 1 is a perspective view of a propeller assembly including propeller blades and a partial hub assembly according to an embodiment of the invention.

Embodiments of the invention relate to a partial hub assembly for retaining propeller blades and propeller assembly incorporating such a partial hub assembly. Conventional hub assemblies are either a single integral component defining a housing or are split into two pieces to create a front part and a rear part that when coupled to each other define a housing. Both integral and split hubs are complex in shape, which leads to increased machining difficulty and cost. Further, both integral and split hubs make propeller assembly and repair more complex. Embodiments of the invention include a partial hub assembly with a rear backing plate with a clamp for each propeller blade, which results in reduced cost of the hub assembly and ease of assembly and repair because, as a non-limiting example, only a portion of the hub needs to be disassembled FIG. 1 illustrates a propeller assembly 10 including a partial hub assembly 12, a cover 13, and several propeller blades 14. The partial hub assembly 12 that rotates about the propeller axis and provides a means to secure multiple blades 14. The partial hub assembly 12 can secure any number of propeller blades 14. Typically a propeller blade 14 is formed in a twisted airfoil shape and can be composed of any suitable material including, but not limited to, metal or composite materials. The propeller blade 14 can be line-removable to provide cost and maintenance advantages. The term line-removable indicates that the propeller blade 14 can be removed and replaced in the field. Line-removable propeller blades 14 can be mounted to the partial hub assembly 12 and must be retained while allowing relative rotatable motion. While one example of an aircraft propeller assembly has been illustrated, it will be understood that any suitable structure or craft, to which a propeller, turbine, or fan having one or more blades is fitted, can utilize embodiments of the invention described herein.

Figure 2:
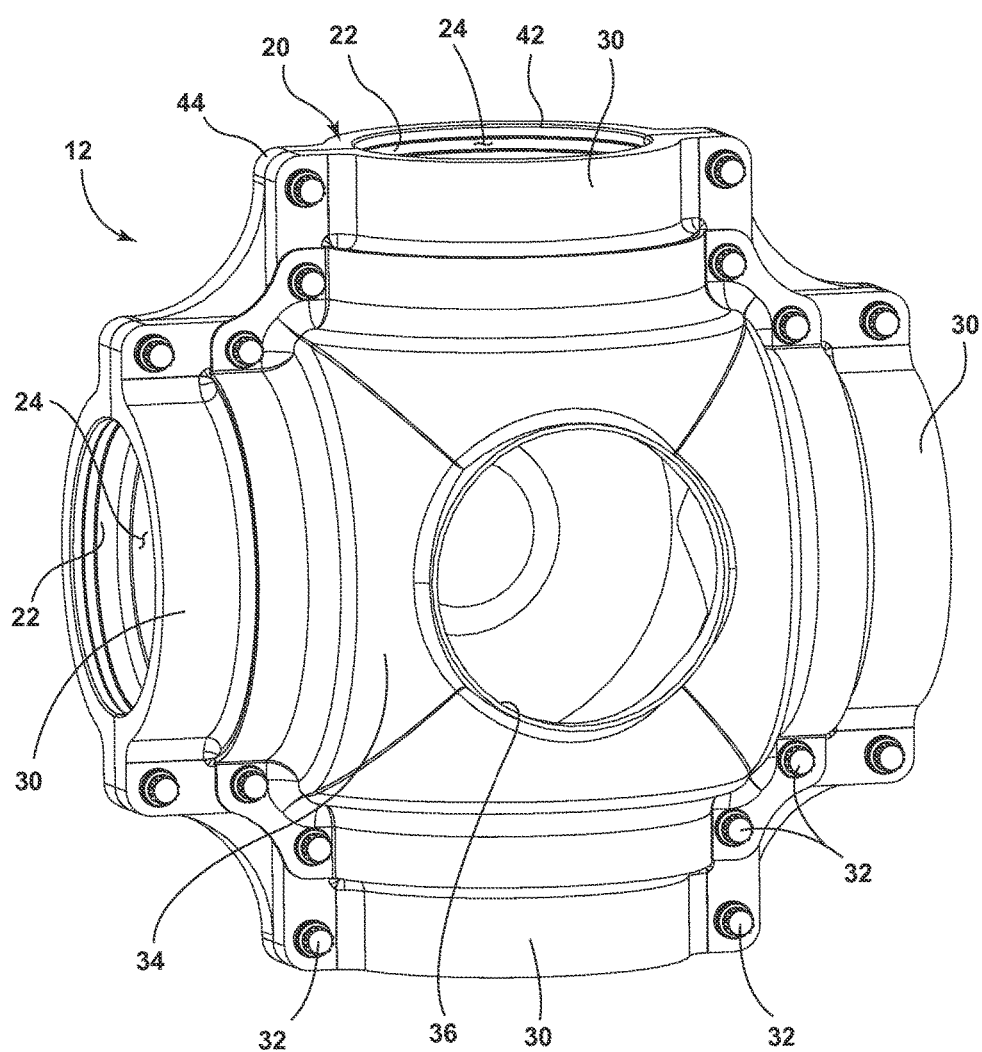
FIG. 2 is a perspective view of a partial hub assembly, which can be used in the propeller assembly of FIG. 1.

FIG. 2 more clearly illustrates that the partial hub assembly 12 includes a first piece or backing plate 20 having a set of partial root seats 22. It will be understood that "a set" as used herein can include any number including only one. A set of clamps 30 can be selectively operably coupled to the backing plate 20. Each clamp 30 defines a partial root seat. When a clamp 30 is operably coupled to the backing plate the partial root seats of the backing plate 20 and the clamp 30 form a blade recess or root seat 24. The backing plate 20 and clamps 30 can be operably mounted together in any suitable manner including, but not limited to, via any suitable fasteners 32.

Further, a cover 34 can be operably coupled over the set of clamps 30. The cover 34 can be formed in any suitable manner and can be included in the partial hub assembly 12 to aid in preventing dirt from entering the partial hub assembly 12. It is contemplated that at least one opening 36 can be included in the cover 34 to accommodate a hydraulic cylinder for a pitch control unit (not shown). The partial hub assembly 12 including the backing plate 20, the clamps 30, and the cover 34 can be formed from any suitable material including metal or composite materials.

Figure 3:
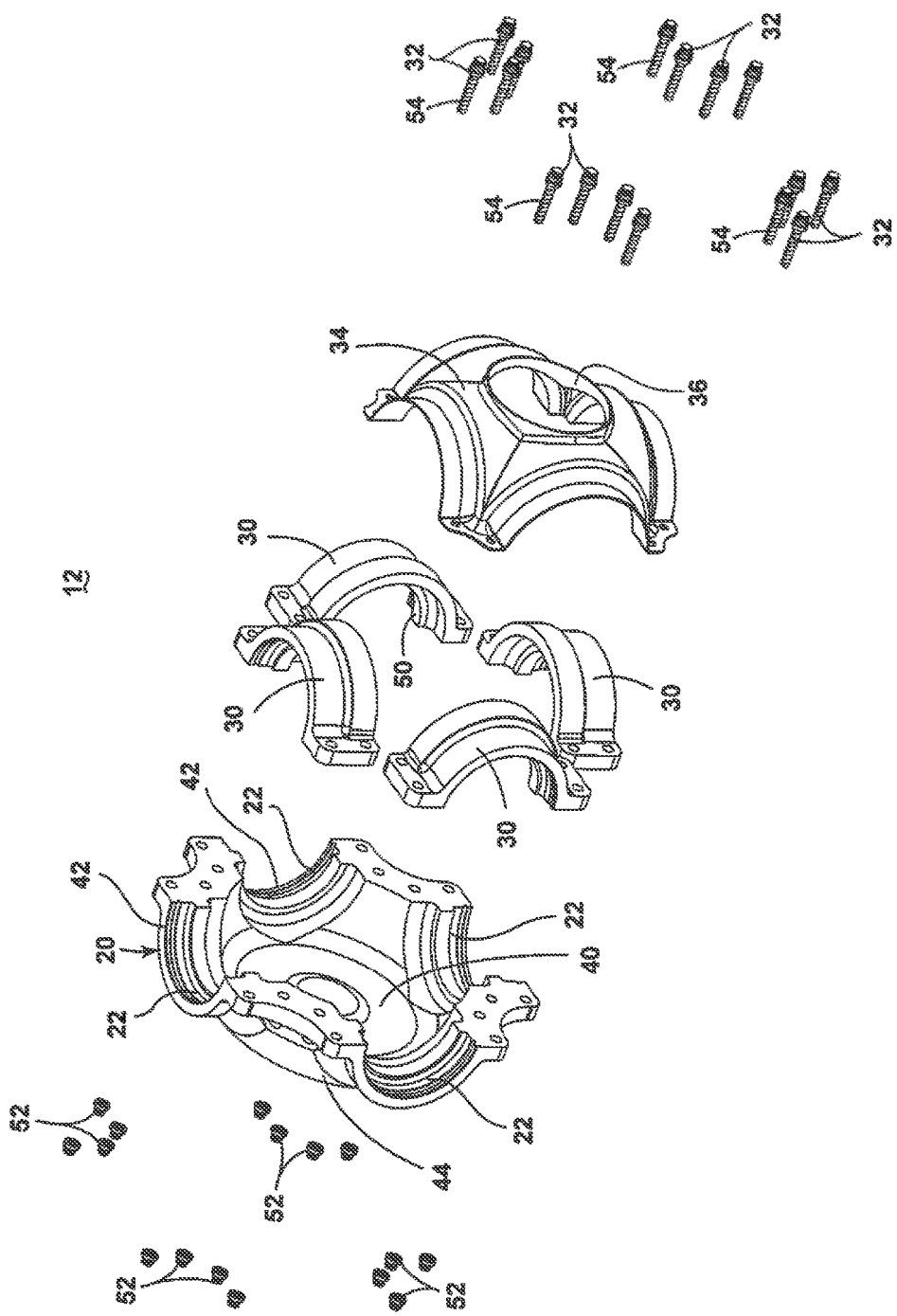
FIG. 3 is an exploded view of the partial hub assembly of FIG. 2.

FIG. 3 more clearly illustrates that the backing plate 20 of the partial hub assembly 12 includes a plate portion 40 with contoured portions 42 forming the partial root seats 22 extending upwards from the plate portion 40 along its periphery 44. It will be understood that while no other features have been illustrated, the backing plate 20 of the partial hub assembly 12 is at a rear side of the propeller assembly and provides a mounting surface for mounting to an engine. Thus, the backing plate 20 can include any features suitable for coupling the partial hub assembly 12 to the engine.

Each clamp 30 also includes contoured portions 50 on its interior, which forms a partial root seat. The clamps 30 and cover 34 can be fastened to the backing plate 20 via fasteners 32. The fasteners 32 can be any suitable fasteners including, but not limited to, nuts 52 and bolts 54 as illustrated.

Figure 4:
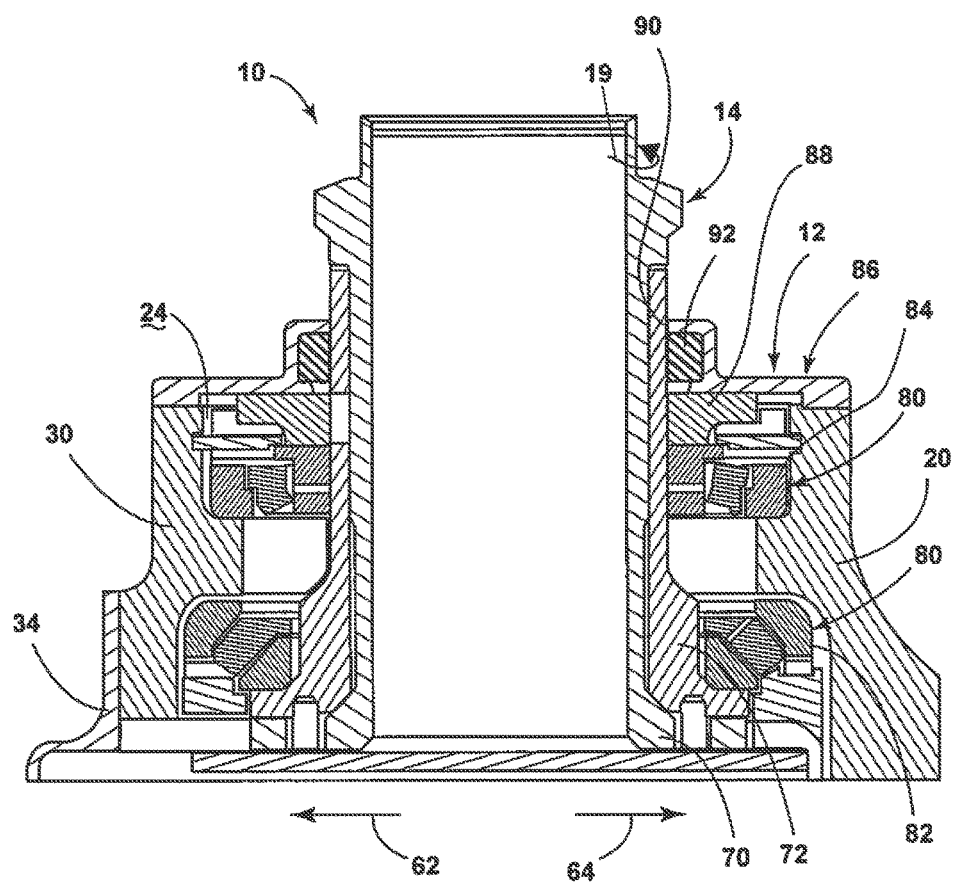
FIG. 4 is a cross-sectional view of a portion of the partial hub assembly of FIG. 2 with a portion of a propeller blade as can be included in the propeller assembly of FIG. 1.

FIG. 4 illustrates a portion of an exemplary propeller assembly 10 including the partial hub assembly 12 and illustrating only a portion of a single propeller blade 14 therein. While a plurality of circumferentially spaced blades 14 can be supported within the partial hub assembly 12 as illustrated in FIG. 1, only a portion of one propeller blade 14 is illustrated in the remaining figures for clarity purposes. Forward 62 and aft 64 directions are also noted.

A portion of the propeller blade 14, for example a root 70 with an optional preload plate 72, can be received within the root seat 24. In this manner, the root seat 24 provides a receptacle for a root 70 of the propeller blade 14 to be inserted. The root 70 can include, but is not limited to, an outer sleeve or an integral part of the propeller blade 14.

A bearing assembly 80 can be provided between the root 70 and the backing plate 20 and clamp 30 of the partial hub assembly 12. The bearing assembly 80 allows the propeller blade 14 to rotate within the partial hub assembly 12. In the illustrated example, multiple bearing assemblies 80 are provided between the root 70 and the partial hub assembly 12.

More specifically, an inboard bearing assembly 82 and an outboard bearing assembly 84 are included. The multiple bearing assemblies can include any suitable type of bearing assembly including, but not limited to, a parallel roller bearing assembly, a ball bearing assembly, or a taper roller bearing assembly. Further, one or more of the multiple bearing assemblies 80 can be preloaded. Contours on the backing plate 20 and the interior of the clamp 30 define a contoured root seat 24, which aid locating the bearing assemblies 80. The inner surface of the clamp 30 has been illustrated as having the same profile as the partial root seats 22 of the backing plate 20.

Further, a pitch control unit (not shown) can be included within the partial hub assembly 12 and can be used to vary the blade pitch of the propeller blades 14 by rotating the propeller blade 14 to turn the angle of attack of the propeller blade 14 as illustrated by the arrows 19. The bearing assemblies 80 can aid in the rotation of the propeller blade 14 during pitch adjustment.

The partial hub assembly 12 effectively wraps around the root 70 when the backing plate 20 and the clamps 30 are operably coupled. A retainer 86 can be selectively operably coupled to the partial hub assembly 12 and can be configured to retain the root 70, and thus the propeller blade 14, within the partial hub assembly 12 when the retainer 86 is coupled to the partial hub assembly 12. More specifically, the retainer 86 can be mounted to an outer periphery of the backing plate 20 and an outer periphery of the clamp 30 and configured to retain the propeller blade 14 within the root seat 24. In the illustrated example, the retainer 86 includes a recess 90 through which the propeller blade 14 can pass and is sized to allow the propeller blade 14 to rotate therein. The retainer 86 can be mounted to the backing plate 20 and the clamps 30 utilizing any suitable fastening mechanism. It will be understood that any suitable retainer can be used including, but not limited to discrete fasteners so long as the propeller blade 14 can be restrained adequately during its rotation.

Further still, a ring nut 88 can be included between the retainer 86 and the outboard bearing assembly 84. The ring nut 88 can be configured to aid in preloading the the outboard bearing assembly 84 and aid in retaining the propeller blade 14. The retainer 86 can locate the ring nut 88 such that it seats the outboard bearing mechanism 84 tightly within the partial hub assembly 12 and does not allow for movement within the root seat 24. The retainer 86 can act as an outboard shoulder to retain the ring nut 88, root 70, and the outboard bearing mechanism 84 from moving radially. Grease or another lubricant can be utilized to lubricate the bearing assemblies 80 and one or more seals can be included within the partial hub assembly 12. By way of non-limiting example, a seal 92 can be housed within a portion of the retainer 86.

During operation, an engine provides rotational motion to the partial hub assembly 12 and the propeller blades 14 convert rotary motion into a propulsive force. More specifically, the backing plate 20 provides a mounting surface to engine and acts as a structural member that transfers torque from the engine to the propeller blade 14. As the retainer 86 and the clamps 30 are removable, the propeller blade 14 can be easily replaced.

Figure 5:
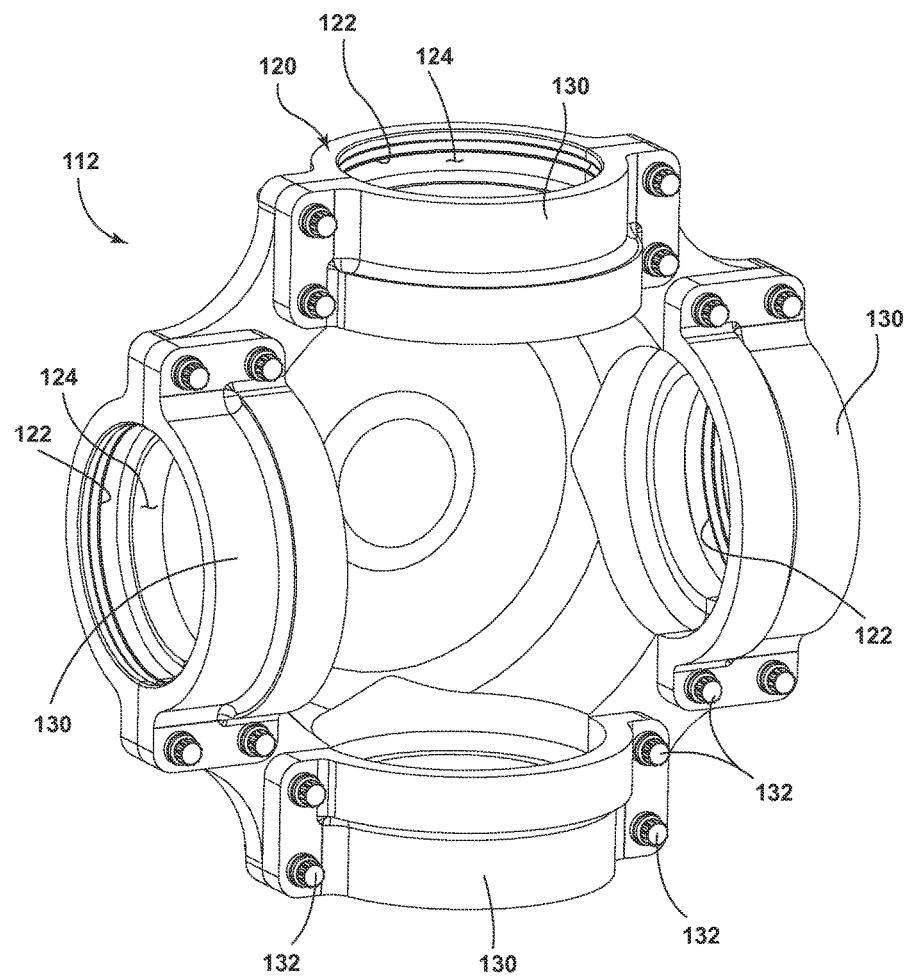
FIG. 5 is a perspective view of an alternative embodiment of a partial hub assembly, which can be used in the assembly of FIG. 1.

FIG. 5 illustrates a partial hub assembly 112 according to a second embodiment of the invention. The second embodiment of the partial hub assembly 112 is similar to the first embodiment of the partial hub assembly 12. Therefore, like parts will be identified with like numerals increased by 100, with it being understood that the description of the like parts of the first embodiment applies to the second embodiment, unless otherwise noted. The only difference is that the partial hub assembly 112 does not include the cover included in the first embodiment. In all other ways the embodiment of FIG. 5 is structured and operates in the same manner as the first embodiment illustrated in FIG. 2.

While the above described-embodiments utilize the term "backing plate" and describe the backing plate as being on the aft side, it will be understood that alternatively the backing plate can be on the forward side and the clamps can be at the aft side. In such an instance, the backing plate can still provide a mounting surface to the engine.

The embodiments described above provide for a variety of benefits including hub and propeller assemblies with reduced weight, which results in reduced operating costs. Further, the above-described partial hub assemblies can be formed easily and have a reduced cost as compared to contemporary hubs. The above described embodiments also provide for easy assembly and repair. Further, the above described embodiments allow the propeller blade to be line replaceable.

To the extent not already described, the different features and structures of the various embodiments can be used in combination with each other as desired. That one feature is not illustrated in all of the embodiments is not meant to be construed that it cannot be, but is done for brevity of description. Thus, the various features of the different embodiments can be mixed and matched as desired to form new embodiments, whether or not the new embodiments are expressly described. All combinations or permutations of features described herein are covered by this disclosure.

This written description uses examples to disclose the invention, including the best mode, and also to enable any person skilled in the art to practice the invention, including making and using any devices or systems and performing any incorporated methods. The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A propeller assembly, comprising:
   a partial hub, comprising:
      a backing plate comprising a plate portion having contoured portions defining a set of partial root seats extending from the plate portion along its periphery; and
      a set of clamps selectively operably couplable to the backing plate with each clamp defining a second partial root seat and wherein when a clamp is coupled to the backing plate, a root seat is formed; and
   a variable pitch propeller blade having a root rotatably received within the root seat;
   further comprising a cover operably coupled over the set of clamps, wherein the cover comprises at least one opening configured to accommodate a pitch control unit.

2. The propeller assembly of claim 1, wherein the backing plate of the partial hub is at a rear side of the propeller assembly and provides a mounting surface to an engine.

3. The propeller assembly of claim 1, wherein each clamp of the set of clamps is fastened to the backing plate.

4. The propeller assembly of claim 1, further comprising a retainer selectively operably coupled to the partial hub and configured to retain the root of the propeller blade within the partial hub when the retainer is coupled to the partial hub.

5. The propeller assembly of claim 4, further comprising a seal located within a portion of the retainer.

6. The propeller assembly of claim 4, further comprising a ring nut between the retainer and a bearing assembly located between the root and the partial hub.

7. The propeller assembly of claim 1, further comprising a bearing assembly between the root and the partial hub, wherein the bearing assembly allows the propeller blade to rotate within the partial hub.

8. The propeller assembly of claim 7, wherein the bearing assembly comprises a parallel roller bearing assembly, a ball bearing assembly, or a taper roller bearing assembly.

9. The propeller assembly of claim 1, comprising multiple bearing assemblies between the root and the partial hub and at least one bearing assembly of the multiple bearing assemblies is preloaded.

10. A propeller assembly, comprising:
    a partial hub, comprising:
       a backing plate comprising a plate portion having a contour portion partially defining a root seat extending from the plate portion along its periphery; and
       a clamp selectively operably couplable to the backing plate to define a second partial root seat and wherein when a clamp is coupled to the backing plate, a root seat is formed;
    a variable pitch propeller blade having a root rotatably received within the root seat;
    a bearing assembly provided between the root and the partial hub, wherein the bearing assembly allows the blade to rotate within the partial hub; and
    a retainer mounted to an outer periphery of the backing plate and an outer periphery of the clamp, and configured to retain the propeller blade within the root seat,
    further comprising a cover operably coupled over the set of clamps, wherein the cover comprises at least one opening configured to accommodate a pitch control unit.

11. The propeller assembly of claim 10, wherein the partial hub comprises a backing plate comprising a plate portion having multiple partial root seats and complementary clamps defining multiple second partial root seats.

12. The propeller assembly of claim 10, wherein the contour portion and an interior of the clamp define a contoured root seat.

* * * * *